US012580232B2

(12) United States Patent
Lee et al.

(10) Patent No.: US 12,580,232 B2
(45) Date of Patent: Mar. 17, 2026

(54) SUB PACK COMPRISING MULTIPLE UNIT MODULES AND BMS ASSEMBLY, AND BATTERY PACK COMPRISING SAME

(71) Applicant: LG ENERGY SOLUTION, LTD., Seoul (KR)

(72) Inventors: Jung-Hoon Lee, Daejeon (KR); Doo-Han Yoon, Daejeon (KR); Jae-Hun Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 668 days.

(21) Appl. No.: 17/633,858

(22) PCT Filed: Jul. 6, 2020

(86) PCT No.: PCT/KR2020/008813
§ 371 (c)(1),
(2) Date: Feb. 8, 2022

(87) PCT Pub. No.: WO2021/125476
PCT Pub. Date: Jun. 24, 2021

(65) Prior Publication Data
US 2022/0399578 A1     Dec. 15, 2022

(30) Foreign Application Priority Data

Dec. 18, 2019    (KR) ........................ 10-2019-0169899

(51) Int. Cl.
*H01M 50/507*      (2021.01)
*H01M 10/42*       (2006.01)
(Continued)

(52) U.S. Cl.
CPC ....... *H01M 10/425* (2013.01); *H01M 10/482* (2013.01); *H01M 50/249* (2021.01);
(Continued)

(58) Field of Classification Search
CPC ............. H01M 50/249; H01M 10/482; H01M 2010/4271; H01M 50/262
See application file for complete search history.

(56) References Cited

U.S. PATENT DOCUMENTS

| 10,230,081 B2 | 3/2019 | Acikgoez et al. |
| 2009/0246616 A1 | 10/2009 | Koyama et al. |

(Continued)

FOREIGN PATENT DOCUMENTS

| CN | 101490871 A | 7/2009 |
| CN | 10151778 A | 8/2009 |

(Continued)

OTHER PUBLICATIONS

Machine translation of JP2008204987A from Esapcenet (Year: 2008).*

(Continued)

*Primary Examiner* — Nicholas A Smith
*Assistant Examiner* — Zachary Richard Cochenour
(74) *Attorney, Agent, or Firm* — Birch, Stewart, Kolasch & Birch, LLP

(57)     ABSTRACT

Disclosed is a sub pack, which includes a battery module assembly having a plurality of unit modules; and a BMS assembly coupled to one longitudinal side of the battery module assembly, the battery module assembly includes a first sub module having a plurality of unit modules connected along a longitudinal direction of the first sub module; and a second sub module having a plurality of unit modules and connected to the first sub module along a width direction of the unit module, and the BMS assembly includes a first BMS for controlling charging and discharging of the first sub module; a second BMS for controlling charging and discharging of the second sub module; and a BMS frame fastened to one longitudinal side of the battery module (Continued)

22
21
T
W
114 assembly and surrounding peripheries of the first BMS and the second BMS.

20 Claims, 14 Drawing Sheets

(51) Int. Cl.
  *H01M 10/48*        (2006.01)
  *H01M 50/249*      (2021.01)
  *H01M 50/262*      (2021.01)

(52) U.S. Cl.
  CPC ....... *H01M 50/262* (2021.01); *H01M 50/507* (2021.01); *H01M 2010/4271* (2013.01); *H01M 2220/20* (2013.01)

(56)          References Cited

U.S. PATENT DOCUMENTS

| | | |
|---|---|---|
| 2009/0325043 A1 | 12/2009 | Yoon et al. |
| 2010/0151299 A1 | 6/2010 | Ha et al. |
| 2016/0172654 A1 | 6/2016 | Lee |
| 2016/0322838 A1 | 11/2016 | Jung |
| 2018/0315976 A1 | 11/2018 | Lee et al. |
| 2019/0081370 A1 | 3/2019 | Capati et al. |
| 2019/0131672 A1 | 5/2019 | Stafl et al. |
| 2019/0259986 A1 * | 8/2019 | Harris, III ........... H01M 50/213 |
| 2019/0372069 A1 | 12/2019 | Lee et al. |
| 2020/0194843 A1 * | 6/2020 | Kwon .................. H01M 50/211 |

FOREIGN PATENT DOCUMENTS

| | | | | |
|---|---|---|---|---|
| CN | 202308118 U | | 7/2012 | |
| CN | 106450056 A | * | 2/2017 | ............ H01M 50/10 |
| CN | 110088938 A | | 8/2019 | |
| EP | 2722909 A1 | * | 4/2014 | ............ H01G 11/10 |
| EP | 3 567 650 A1 | | 11/2019 | |
| JP | 2008204987 A | * | 9/2008 | ............... H01G 2/04 |
| KR | 10-2013-0136744 A | | 12/2013 | |
| KR | 10-2015-0022398 A | | 3/2015 | |
| KR | 10-2015-0076913 A | | 7/2015 | |
| KR | 10-2015-0076963 A | | 7/2015 | |
| KR | 10-2016-0128792 A | | 11/2016 | |
| KR | 10-2017-0011212 A | | 2/2017 | |
| KR | 10-2017-0042407 A | | 4/2017 | |
| KR | 10-2017-0138848 A | | 12/2017 | |
| KR | 10-2019-0011096 A | | 2/2019 | |
| KR | 10-2019-0032887 A | | 3/2019 | |
| WO | WO 2012/15323 A1 | | 11/2012 | |
| WO | WO 2017/003168 A1 | | 1/2017 | |
| WO | WO2019/044724 A1 | | 3/2019 | |
| WO | WO2012/173233 A1 | | 11/2025 | |

OTHER PUBLICATIONS

Machine translation of CN 106450056 A from PE2E (Year: 2017).*
International Search Report for PCT/KR2020/008813 mailed on Oct. 27, 2020.
Extended European Search Report for European Application No. 20901113.9, dated Sep. 28, 2023.

* cited by examiner

SUB PACK COMPRISING MULTIPLE UNIT MODULES AND BMS ASSEMBLY, AND BATTERY PACK COMPRISING SAME

TECHNICAL FIELD

The present disclosure relates to a sub pack including a plurality of unit modules and a BMS assembly, and a battery pack including the same, and more specifically, to a sub pack in which a plurality of unit modules are electrically connected through connecting wires in series and parallel, and a battery pack in which a pair of sub packs are connected in series through a serial bus bar.

The present application claims priority to Korean Patent Application No. 10-2019-0169899 filed on Dec. 18, 2019 in the Republic of Korea, the disclosures of which are incorporated herein by reference.

BACKGROUND ART

A secondary battery easily applicable to various product groups and having electrical characteristics such as high energy density is universally applied to not only portable devices but also electric vehicles (EV) or hybrid vehicles (HEV) driven by an electric drive source. The secondary battery is attracting attention as a new energy source for eco-friendliness and energy efficiency because of a primary advantage that it may dramatically reduce the use of fossil fuels and a secondary advantage that it does not generate by-products from the use of energy.

Types of secondary batteries currently widely used in the art include lithium ion batteries, lithium polymer batteries, nickel cadmium batteries, nickel hydride batteries, nickel zinc batteries, and the like. A unit secondary battery cell, namely a unit battery cell, has an operating voltage of about 2.5V to 4.5V. Therefore, if a higher output voltage is demanded, a battery pack is formed by connecting a plurality of battery cells in series. In addition, the battery pack may be formed by connecting a plurality of battery cells in parallel according to the charge/discharge capacity required for the battery pack. Accordingly, the number of battery cells included in the battery pack may be variously set according to the required output voltage or charge/discharge capacity.

Meanwhile, when a battery pack is configured by connecting a plurality of battery cells in series/parallel, generally, a battery module including at least one battery cell is configured first, and other components are added to the at least one battery module to configure a battery pack.

Therefore, it is necessary to minimize a loss in terms of component cost reduction and management by developing a battery pack having a structure in which a plurality of unit modules may be electrically/mechanically coupled with each other as simple as possible and the unit modules and a battery management system (BMS) may be electrically/mechanically coupled with each other as simple as possible.

DISCLOSURE

Technical Problem

The present disclosure is designed to solve the problems of the related art, and therefore the present disclosure is directed to minimizing a loss in terms of component cost reduction and management by providing a sub pack having a structure in which a plurality of unit modules may be electrically/mechanically coupled with each other as simple as possible and the unit modules and a BMS may be electrically/mechanically coupled with each other as simple as possible, and a battery pack including such sub packs.

However, the technical problem to be solved by the present disclosure is not limited to the above, and other problems not mentioned above may be clearly understood by those skilled in the art from the following description.

Technical Solution

In one aspect of the present disclosure, there is provided a sub pack, comprising: a battery module assembly having a plurality of unit modules; and a BMS assembly coupled to one longitudinal side of the battery module assembly, wherein the battery module assembly includes: a first sub module having a plurality of unit modules connected along a longitudinal direction of the first sub module; and a second sub module having a plurality of unit modules and connected to the first sub module along a width direction of the unit module, wherein the BMS assembly includes: a first BMS configured to control charging and discharging of the first sub module; a second BMS configured to control charging and discharging of the second sub module; and a BMS frame fastened to one longitudinal side of the battery module assembly and surrounding peripheries of the first BMS and the second BMS.

The unit module may include a plurality of battery cells forming a plurality of cell groups; a lower housing supporting the plurality of battery cells; an upper housing coupled to an upper portion of the lower housing to provide an accommodation space for the plurality of battery cells; and a plurality of parallel bus bars placed on an upper surface of the upper housing and arranged side by side and spaced apart from each other.

The cell group may include a plurality of battery cells disposed along a longitudinal direction of the unit module.

The battery cells included in the same cell group may be connected in parallel through the parallel bus bar.

The plurality of unit modules included in the first sub module may be connected in parallel by an electric connection between the parallel bus bars located on the same extension line, and the plurality of unit modules included in the second sub module may be connected in parallel by an electric connection between the parallel bus bars located on the same extension line.

The first sub module and the second sub module may be connected to each other in series by an electric connection between parallel bus bars adjacent to each other.

The parallel connection between the plurality of battery cells included in the same cell group, the parallel connection between the plurality of unit modules included in the same sub module and the serial connection between the plurality of sub modules adjacent to each other may be made by wire bonding.

The lower housing may include at least one fastening protruding portion having a bolting hole and provided to one longitudinal side of the lower housing; at least one fixing protruding portion having a fixing protrusion and provided to one longitudinal side of the lower housing; a first fastening accommodation portion provided to the other longitudinal side of the lower housing and having a shape corresponding to the fastening protruding portion at a location corresponding thereto; and a first fixing accommodation portion provided to the other longitudinal side of the lower housing and having a shape corresponding to the fixing protruding portion at a location corresponding thereto.

The upper housing may include a bolting hole formed at a location corresponding to the first fastening accommodation portion; and a protrusion accommodating groove formed at a location corresponding to the first fixing accommodation portion and having a shape corresponding to the fixing protrusion.

The BMS frame may include a plurality of front fastening portions provided at a location corresponding to the fastening protruding portion and having a bolting hole; a plurality of second fastening accommodation portions provided at locations corresponding to the front fastening portion and the fastening protruding portion; and a plurality of second fixing accommodation portions provided at a location corresponding to the fixing protruding portion and having a shape corresponding thereto.

Each of the first BMS and the second BMS may include a plurality of sensing terminals, the sensing terminals of the first BMS may be electrically connected to the parallel bus bar of the first sub module by wire bonding, and the sensing terminals of the second BMS may be electrically connected to the parallel bus bar of the second sub module by wire bonding.

In another aspect of the present disclosure, there is also provided a battery pack in which a pair of sub packs according to an embodiment of the present disclosure are coupled to each other in a mirror-symmetric form based on a central axis parallel to a longitudinal direction of the sub pack.

The battery pack may further comprise a serial bus bar placed on the BMS frame to connect the pair of sub packs to each other in series.

In another aspect of the present disclosure, there is also provided a vehicle, comprising the battery pack according to an embodiment of the present disclosure.

Advantageous Effects

According to an embodiment of the present disclosure, a plurality of unit modules of a battery pack may be electrically/mechanically coupled with each other as simple as possible and the unit modules and a BMS may be electrically/mechanically coupled with each other as simple as possible, and a battery pack including such sub packs, thereby minimizing a loss in terms of component cost reduction and management.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
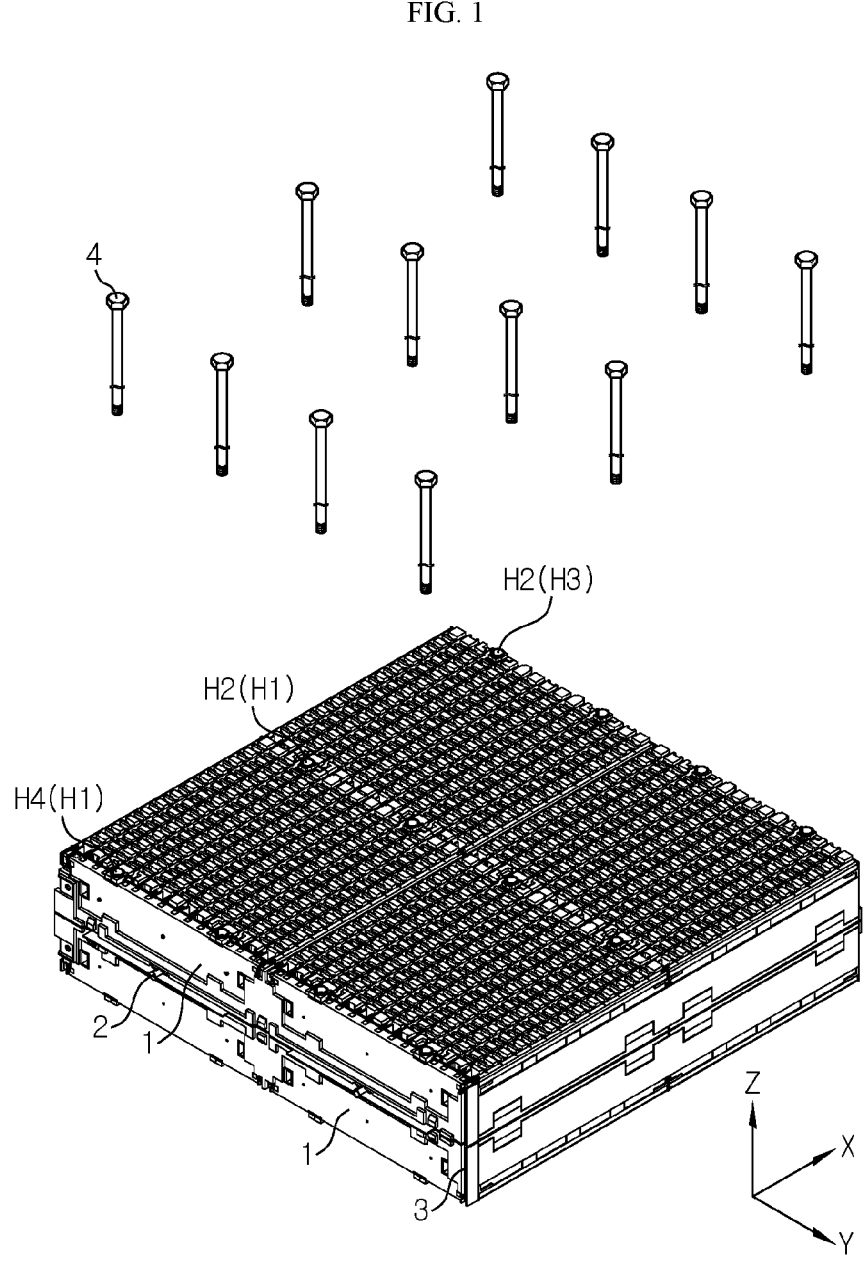
FIG. 1 is a perspective view showing a battery pack according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, a schematic structure of a battery pack according to an embodiment of the present disclosure will be described with reference to FIGS. 1 to 5.

Referring to FIGS. 1 to 5, the battery pack according to an embodiment of the present disclosure includes a pair of sub packs 1, a heat sink 2, a serial bus bar 3, and a plurality of fastening bolts 4.

The pair of sub packs 1 are coupled to each other in a mirror-symmetric form based on a central axis parallel to a width direction (Y-axis direction) of the battery pack with the heat sink 2 being interposed therebetween. In other words, the pair of sub packs 1 are coupled in a state where bottom surfaces thereof face each other. Hereinafter, when necessary for convenience of description, the sub pack 1 positioned at an upper portion will be referred to as a first sub pack, and the sub pack 1 positioned at a lower portion will be referred to as a second sub pack. The detailed structure of the sub pack 1 will be described later in detail with reference to FIG. 3.

The heat sink 2 is a component applied for cooling the battery pack, and is interposed between the pair of sub packs 1 so that both sides thereof contact bottom surfaces of the pair of sub packs 1, respectively.

The serial bus bar 3 connects the pair of sub packs 1, which are coupled to each other in a mirror-symmetric form, in series. That is, the parallel bus bar 114 located at an outermost part of one side of the first sub pack 1 in a width direction (a direction parallel to the Y-axis) and the parallel bus bar 114 located at an outermost part of one side of the second sub pack 1 in a width direction (a direction parallel to the Y-axis) have different polarities, and the serial bus bar 3 connects the pair of parallel bus bars 114 so that the pair of sub packs 1 are connected in series.

The fastening bolt 4 may be used for fastening the pair of sub packs 1 to each other. In addition, unlike this, the fastening bolt 4 may be used for fastening the unit modules 110 to each other and fastening the battery module assembly 10 and the BMS assembly 20 to each other, and thus the pair of sub packs 1 completely fabricated as above may be coupled by an adhesive layer interposed between the first sub pack 1 and the heat sink 2 and between the second sub pack 1 and the heat sink 2. In addition, it is also possible to apply both fastening by bolting and coupling by interposing an adhesive layer in order to maximize the coupling force.

Next, a schematic structure of the sub pack 1 according to an embodiment of the present disclosure will be described with reference to FIGS. 3 to 5.

Figure 3:
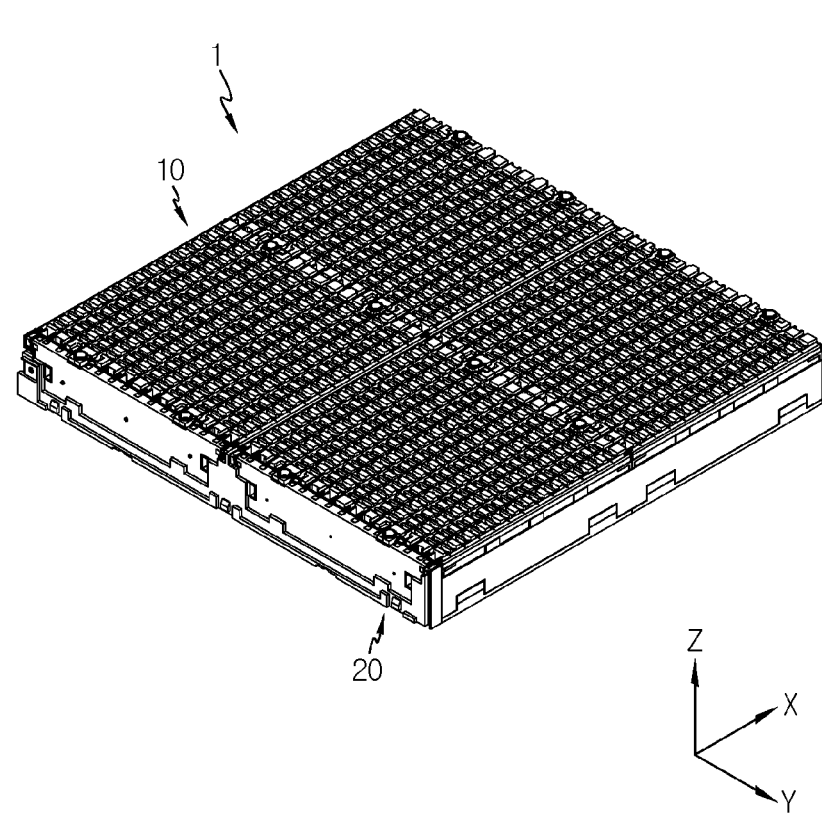
FIG. 3 is a perspective view showing a sub pack according to an embodiment of the present disclosure.
Figure 4:
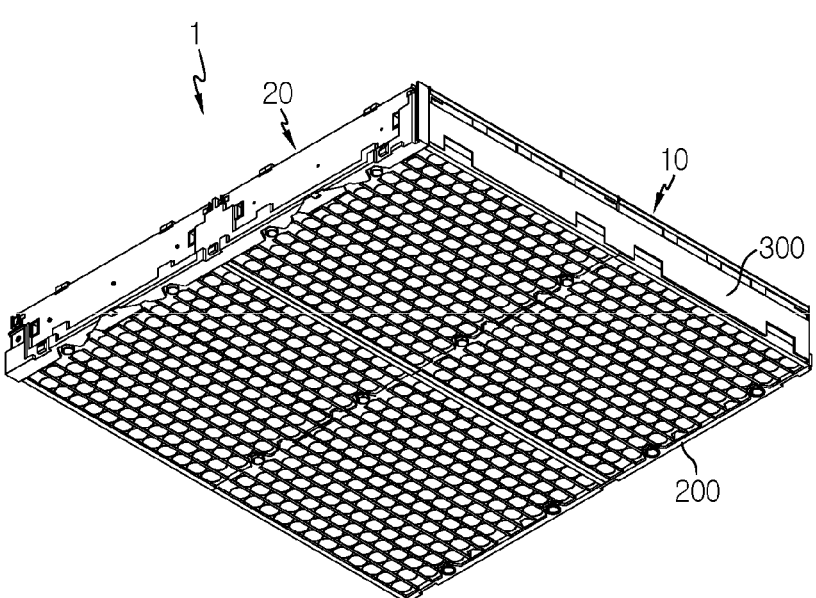
FIG. 4 is a perspective view showing a lower surface of the sub pack depicted in FIG. 3.
Figure 5:
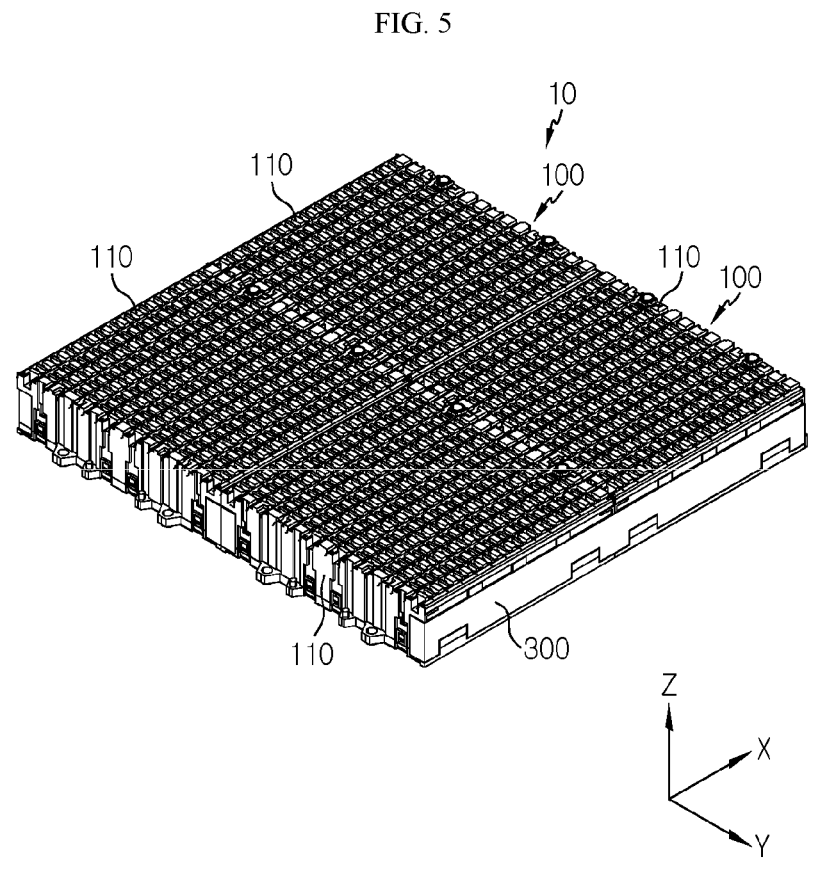
FIG. 5 is a perspective view showing a battery module assembly applied to the sub pack according to an embodiment of the present disclosure.
Figure 6:
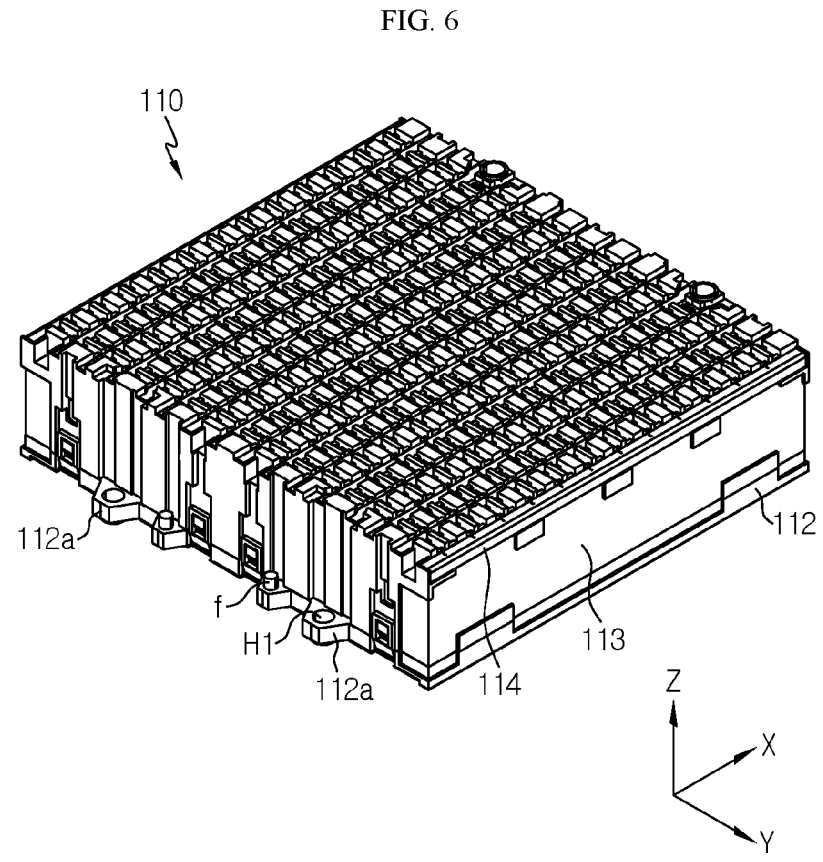
FIG. 6 is a perspective view showing a unit module applied to the battery module assembly depicted in FIG. 5.
Figure 7:
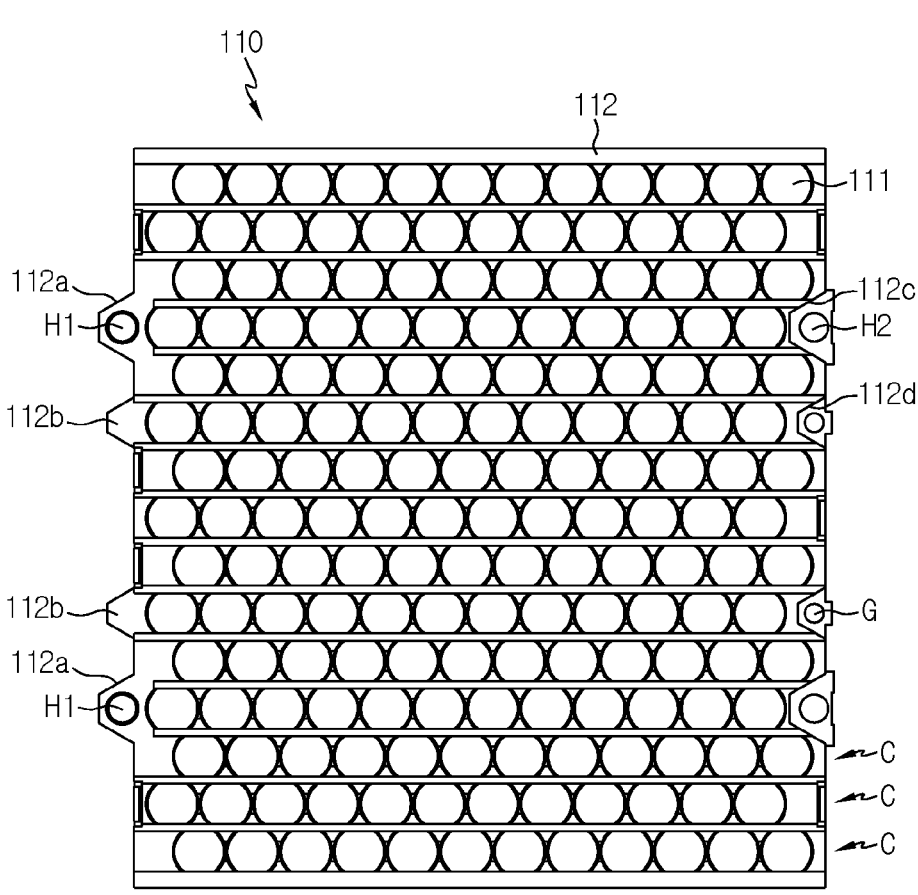
FIG. 7 is a diagram showing a lower surface of the unit module depicted in FIG. 6.
Figure 8:
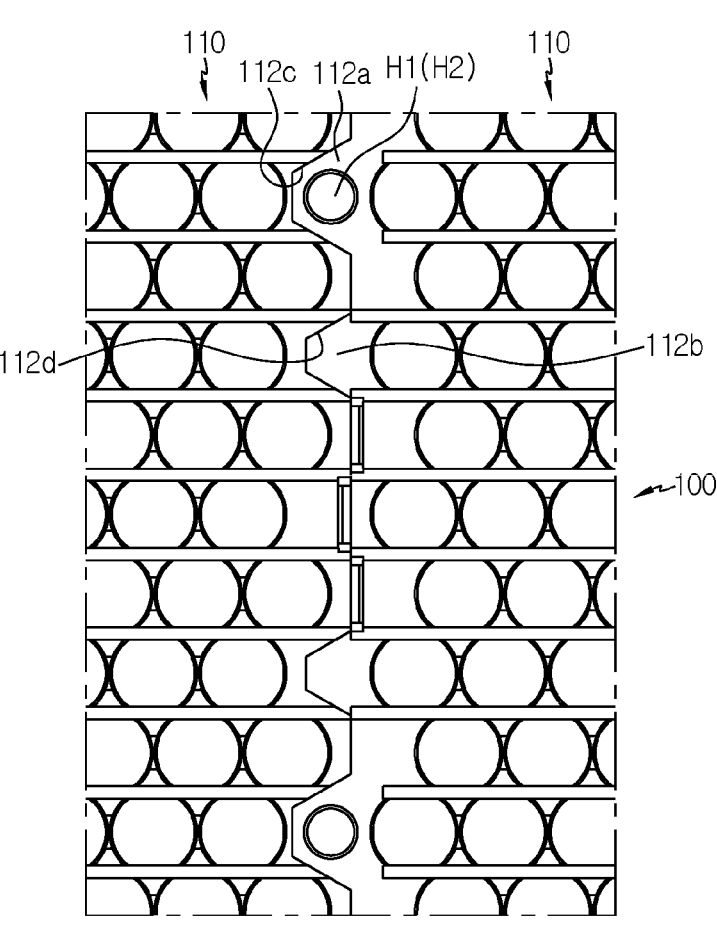
FIG. 8 is a partially enlarged view showing a coupling relationship between a pair of unit modules to configure a sub module applied to the battery module assembly depicted in FIG. 5.

Referring to FIGS. 3 to 5, the sub pack 1 according to an embodiment of the present disclosure includes a battery module assembly 10 and a BMS assembly 20.

The battery module assembly 10 includes a plurality of sub modules 100, a rear block 200 and a side beam 300.

The plurality of sub modules 100 are connected to each other in series, and each sub module 100 includes a plurality of unit modules 110 connected to each other in parallel. In the figures, it is illustrated that one sub module 100 includes two unit modules 110 coupled to each other and one battery module assembly 10 includes two sub modules 100 coupled to each other, but the present disclosure is not limited thereto. That is, one sub module 100 may include three or more unit modules 110 coupled to each other, and one battery module assembly 10 may include three or more sub modules 100 coupled to each other. Meanwhile, for convenience of explanation, the pair of sub modules 100 shown in FIG. 5 will be distinguishably referred to as a first sub module 100 and a second sub module 100.

Hereinafter, a specific structure of the unit module 110 will be described with reference to FIGS. 6 to 9.

Referring to FIGS. 6 to 9, the unit module 110 includes a plurality of battery cells 111, a lower housing 112, an upper housing 113, and a plurality of parallel bus bars 114.

As the battery cell 111, a cylindrical battery cell may be applied, for example. The battery cell 111 may be provided in plural along a longitudinal direction of the unit module 110 (a direction parallel to the X-axis in FIG. 6) and provided in plural along a width direction of the unit module 110 (a direction parallel to the Y-axis in FIG. 6). The plurality of battery cells 111 are arranged to stand upright on the lower housing 112. Each of the plurality of battery cells 111 includes a positive electrode terminal 111a and a negative electrode terminal 111b exposed to the outside through an upper surface of the upper housing 113. When the battery cell 111 is a cylindrical battery cell, a can accommodating an electrode assembly may function as the negative electrode terminal 111b.

The plurality of battery cells 111 disposed along the longitudinal direction of the unit module 110 are connected in parallel to each other to form one cell group C. In addition, a plurality of cell groups C arranged along the width direction of the unit module 110 are connected in series with each other. Hereinafter, if necessary for convenience of description, two cell groups C adjacent to each other among the plurality of cell groups C will be distinguishably referred as a first cell group and a second cell group.

Figure 9:
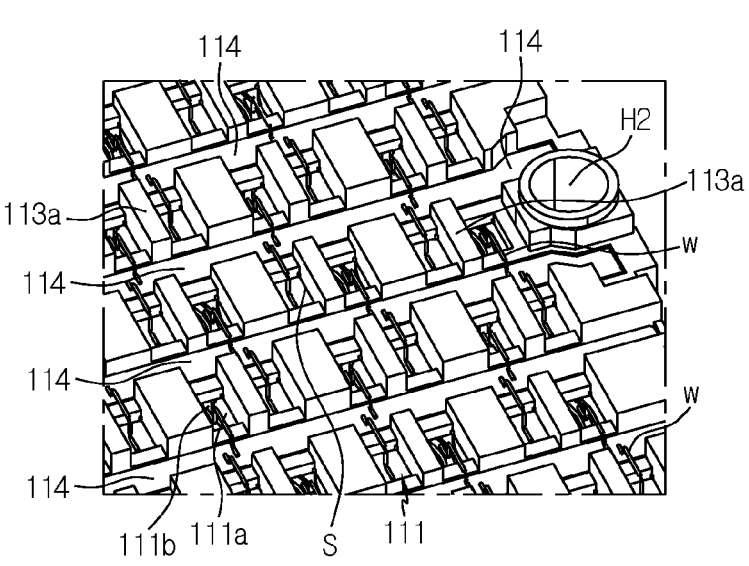
FIG. 9 is a partial perspective view showing an upper surface of the unit module depicted in FIG. 6.

Referring to FIG. 9, such a parallel/serial connection is implemented using a plurality of parallel bus bars 114 and connecting wires W. The parallel bus bars 114 are disposed at both sides of each cell group C. The positive electrode terminals 111a of the battery cells 111 forming the first cell group C are connected to the parallel bus bar 114 located at one side of the first cell group C by wire bonding. The negative electrode terminals 111b of the battery cells 111 forming the first cell group C are connected to the parallel bus bar 114 located at the other side of the first cell group C by wire bonding. Accordingly, the plurality of battery cells 111 forming the first cell group C are connected in parallel with each other.

In addition, the positive electrode terminals 111a of the plurality of battery cells 111 forming the second cell group C adjacent to the first cell group C are connected to the parallel bus bar 114 located at one side of the second cell group, namely the parallel bus bar 114 located at the other side of the first cell group C, by wire bonding. The negative electrode terminals 111b of the plurality of battery cells 111 forming the second cell group C are connected to the parallel bus bar 114 located at the other side of the second cell group C by wire bonding. Accordingly, the plurality of battery cells 111 forming the second cell group C are connected in parallel with each other, and the first cell group C and the second cell group C are connected in series with each other.

Referring to FIGS. 6 to 9, the lower housing 112 supports the plurality of battery cells 111, and may include a fastening protruding portion 112a, a fixing protruding portion 112b, a first fastening accommodation portion 112c, and a first fixing accommodation portion 112d. The fixing protruding portion 112b and the first fixing accommodation portion 112d are not essential components necessarily required, but serve as components for convenience in fastening the unit modules 110 to each other.

At least one fastening protruding portion 112a is provided at one side of the lower housing 112 in a longitudinal direction (parallel to the X-axis in FIG. 6), and protrudes outward from the lower housing 112. The fastening protruding portion 112a has a bolting hole H1 into which a fastening bolt 4 (see FIG. 1) may be inserted along a height direction of the unit module 110 (a direction parallel to the Z-axis in FIG. 6). At least one fixing protruding portion 112b is provided at one longitudinal side of the lower housing 112 and protrudes outward from the lower housing 112. The fixing protruding portion 112b has a fixing protrusion f protruding in an upward direction (a direction parallel to the Z-axis in FIG. 6).

The first fastening accommodation portion 112c is provided at the other longitudinal side of the lower housing 112, and has a shape corresponding to the fastening protruding portion 112a at a location corresponding thereto. Therefore, when the plurality of unit modules 110 are fastened along the longitudinal direction to form the sub module 100, the fastening protruding portion 112a of one unit module 110 is inserted into the first fastening accommodation portion 112c of another adjacent unit module 110. In addition, the upper housing 113 has a bolting hole H2 formed at a location corresponding to the first fastening accommodation portion 112c. Accordingly, when the pair of unit modules 110 are coupled, the bolting hole H1 provided to the lower housing 112 and the bolting hole H2 provided to the upper housing 113 are placed at the same location so that one fastening bolt 4 (see FIG. 1) may pass therethrough.

The first fixing accommodation portion 112*d* is provided at the other longitudinal side of the lower housing 112 and has a shape corresponding to the fixing protruding portion 112*b* at a location corresponding thereto. Therefore, when the plurality of unit modules 110 are fastened along the longitudinal direction to form the sub module 100, the fixing protruding portion 112*b* of one unit module 110 is inserted into the first fixing accommodation portion 112*d* of another adjacent unit module 110. In addition, the upper housing 113 has a protrusion accommodating groove G formed at a location corresponding to the first fixing accommodation portion 112*d*. Accordingly, when the pair of unit modules 110 are coupled, the fixing protrusion f provided to the lower housing 112 is inserted into the protrusion accommodating groove G provided to the upper housing 113. By doing so, the pair of unit modules 110 may be fixed not to move in the horizontal direction (a direction parallel to the X-Y plane in FIG. 6).

The upper housing 113 provides a space for accommodating the plurality of battery cells 111 and has at least one bolting hole H2 and a plurality of cell exposing portions 113*a* formed at the upper surface thereof.

As mentioned above, the bolting hole H2 is formed at a location corresponding to the first fastening accommodation portion 112*c* of the lower housing 112 to provide a space into which the fastening bolt 4 (see FIG. 1) may be inserted.

The cell exposing portion 113*a* has a shape extending along a longitudinal direction of the upper housing 113 (a direction parallel to the X-axis in FIG. 6), and is provided at a location corresponding to the cell group C in the same number as the number of cell groups C. The cell exposing portion 113*a* includes a plurality of slits S so that the positive electrode terminal 111*a* and the negative electrode terminal 111*b* of the battery cell 111 may be exposed to the outside through the upper surface of the upper housing 113.

In the plurality of the battery cells 111 provided in one unit module 110, the positive electrode terminal 111*a* and the negative electrode terminal 111*b* exposed through the slits S are connected to the parallel bus bar 114 by wire bonding to make an electric connection where serial connections and parallel connections are mixed.

Figure 10:
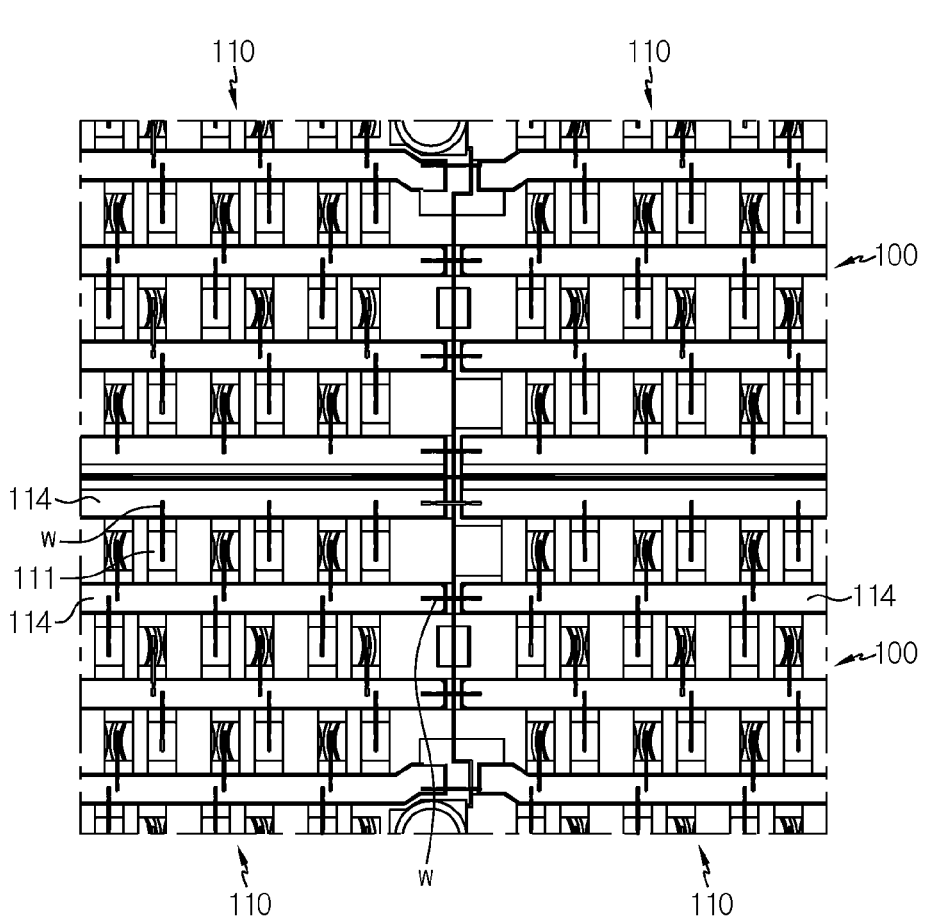
FIG. 10 is a diagram showing an electric connection between the unit modules of the battery module assembly depicted in FIG. 5.

The parallel bus bar 114 has a shape extending in a direction parallel to the cell exposing portion 113*a*, and is placed on the upper surface of the upper housing 113. The parallel bus bar 114 is disposed at both sides of each of the plurality of cell exposing portions 113*a*. Among the plurality of parallel bus bars 114, the parallel bus bar 114 disposed at one end of the unit module 110 in a width direction (a direction parallel to the Y-axis in FIG. 6) and the parallel bus bar 114 disposed at the other end thereof have different polarities. This is to allow the plurality of sub modules 100 to be connected to each other in series along the width direction of the unit module 110. Referring to FIG. 10, a pair of parallel bus bars 114 provided at the outermost sides of the sub modules 100 adjacent to each other contact each other or are connected by wire bonding, so that the adjacent sub modules 100 may be connected in series.

Figure 11:
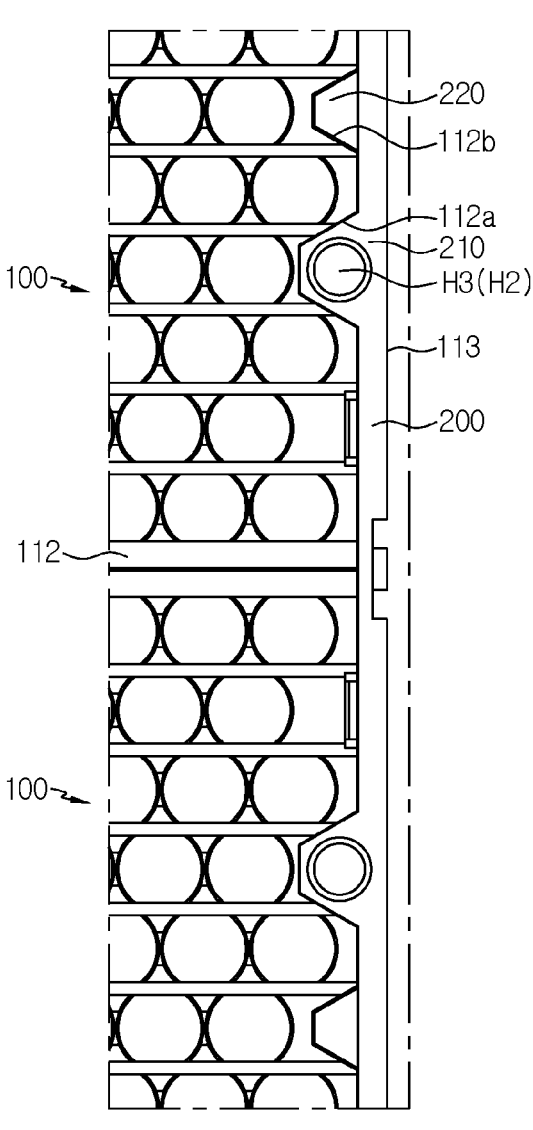
FIG. 11 is a diagram showing a rear block applied to the battery module assembly depicted in FIG. 5.
Figure 12:
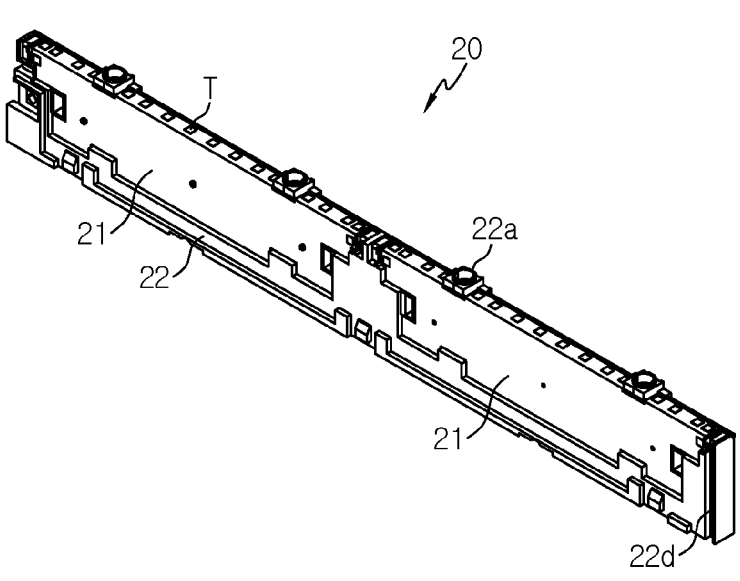
FIGS. 12 and 13 are perspective views showing a BMS assembly of the sub pack depicted in FIG. 3.
Figure 13:
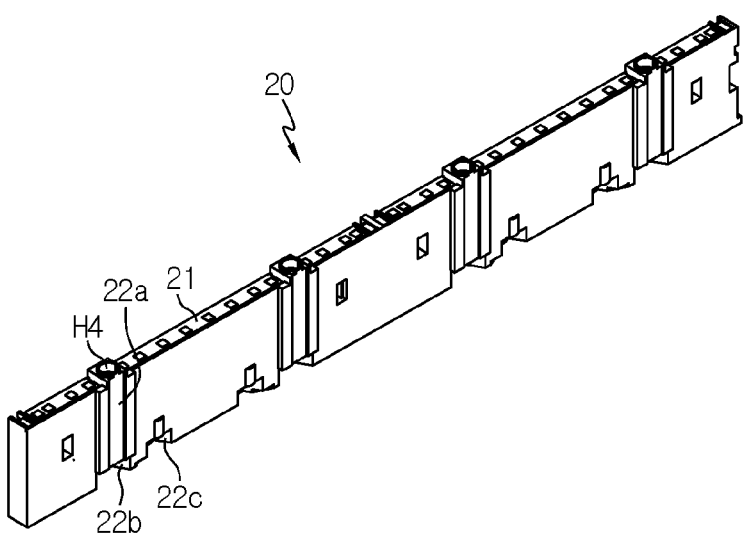

Referring to FIG. 11, the rear block 200 is a component applied for mechanical fastening of the plurality of sub modules 100 and includes a plurality of rear fastening portions 210 and a plurality of rear fixing portions 220.

The rear fastening portion 210 has a shape corresponding to the first fastening accommodation portion 112*c* of the lower housing 112 at a location corresponding thereto. The rear fastening portion 210 has a bolting hole H3 formed in a size corresponding to the bolting hole H2 of the upper housing 113 at a location corresponding thereto.

The rear fixing portion 220 has a shape corresponding to the first fixing accommodation portion 112*d* of the lower housing 112 at a location corresponding thereto. Although not shown in the figures, the rear fixing portion 220 may have a fixing protrusion formed in a size corresponding to the protrusion accommodating groove G (see FIG. 7) of the upper housing 113 at a location corresponding thereto.

Next, the BMS assembly 20 will be described in detail with reference to FIGS. 12 to 16.

Referring to FIGS. 12 to 16, the BMS assembly 20 includes a plurality of battery management systems (BMSs) 21 and a BMS frame 22 for surrounding and fixing the plurality of BMS 21 at once. The BMS assembly 20 is coupled to one side of the battery module assembly 10 (see FIG. 5) in a longitudinal direction (a direction parallel to the X-axis in FIG. 5). That is, the BMS assembly 20 is provided in the same number as the number of sub packs 1.

Figure 14:
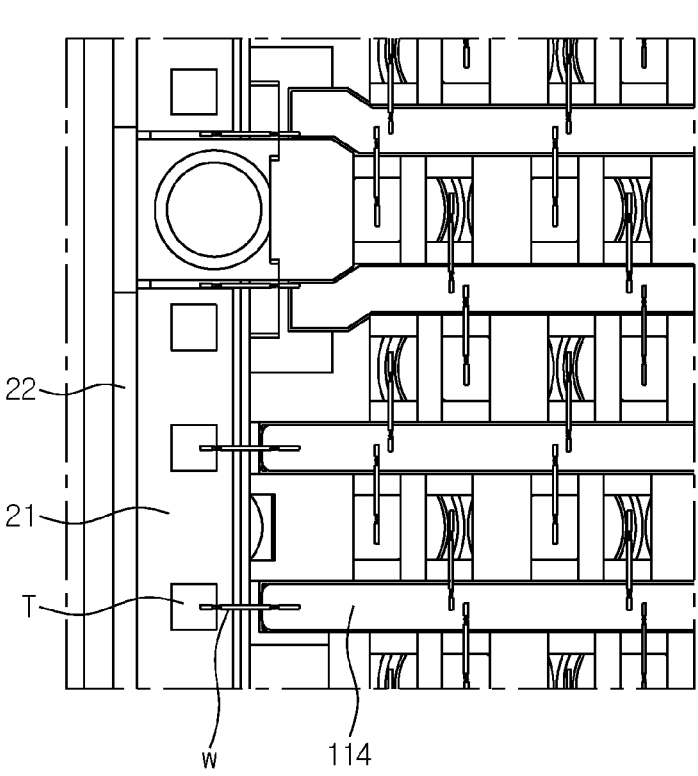
FIG. 14 is a diagram showing an electric coupling between the BMS assembly depicted in FIGS. 12 and 13 and the battery module assembly depicted in FIG. 5.

The BMS 21 is provided in plural, and the BMSs 21 are connected to the sub modules 100 in one-to-one relationship through a plurality of sensing terminals T provided to an upper portion thereof. That is, the BMSs 21 are provided in the same number as the number of sub modules 100. As shown in FIG. 14, the sensing terminals T of the BMS 21 are connected to the parallel bus bars 114 in one-to-one relationship by wire bonding using a connecting wire W. Accordingly, one BMS 21 may sense voltage and/or current of a plurality of cell groups C (refer to FIG. 7) and accordingly controls charging and discharging of the sub module 100. In the figures, it is exemplarily illustrated that two BMSs 21 are provided to each BMS assembly 20. In this case, the BMSs 21 will be referred to as a first BMS 21 and a second BMS 21 for convenience of explanation.

The first BMS 21 controls charging and discharging of the first sub module 100 (see FIG. 5), and the second BMS 21 controls charging and discharging of the second sub module 100 (see FIG. 5) adjacent to the first sub module 100.

The BMS frame 22 surrounds and fixes the plurality of BMSs 21 at once, and is coupled to one longitudinal side of the battery module assembly 10 (see FIG. 5). The BMS frame 22 has a shape extending along the width direction of the battery module assembly 10 (see FIG. 5) (a direction parallel to the Y-axis in FIG. 5), and has a length corresponding to the width of the battery module assembly 10.

The BMS frame 22 may include a plurality of front fastening portions 22*a*, a plurality of second fastening accommodation portions 22*b*, a plurality of second fixing accommodation portions 22*c*, and a bus bar placing portion 22*d*.

The front fastening portion 22*a* is provided at a location corresponding to the fastening protruding portion 112*a* and has a bolting hole H4. The bolting hole H4 formed at the front fastening portion 22*a* has a shape corresponding to the bolting hole H1 formed in the lower housing 112 at a location corresponding thereto. Accordingly, one fastening bolt 4 (see FIGS. 1 and 2) may simultaneously pass through the bolting hole H4 formed in the front fastening portion 22*a* and the bolting hole H1 formed in the lower housing 112, and thus the battery module assembly 10 and the BMS assembly 20 may be fastened.

The second fastening accommodation portion 22*b* has a groove shape at locations corresponding to the front fastening portion 22*a* and the fastening protruding portion 112*a*. The second fastening accommodation portion 22*b* has a shape corresponding to the fastening protruding portion 112*a*, and accordingly the fastening protruding portion 112*a* may be inserted into the second fastening accommodation portion 22*b* so that the BMS assembly 20 and the battery module assembly 10 come into close contact with each other.

The second fixing accommodation portion 22*c* has a groove shape at a location corresponding to the fixing protruding portion 112*b*. The second fixing accommodation portion 22*c* has a shape corresponding to the fixing protruding portion 112*b*, and accordingly the fixing protruding portion 112*b* may be inserted into the second fixing accommodation portion 22*c* so that the BMS assembly 20 and the battery module assembly 10 come into close contact with each other.

Figure 15:
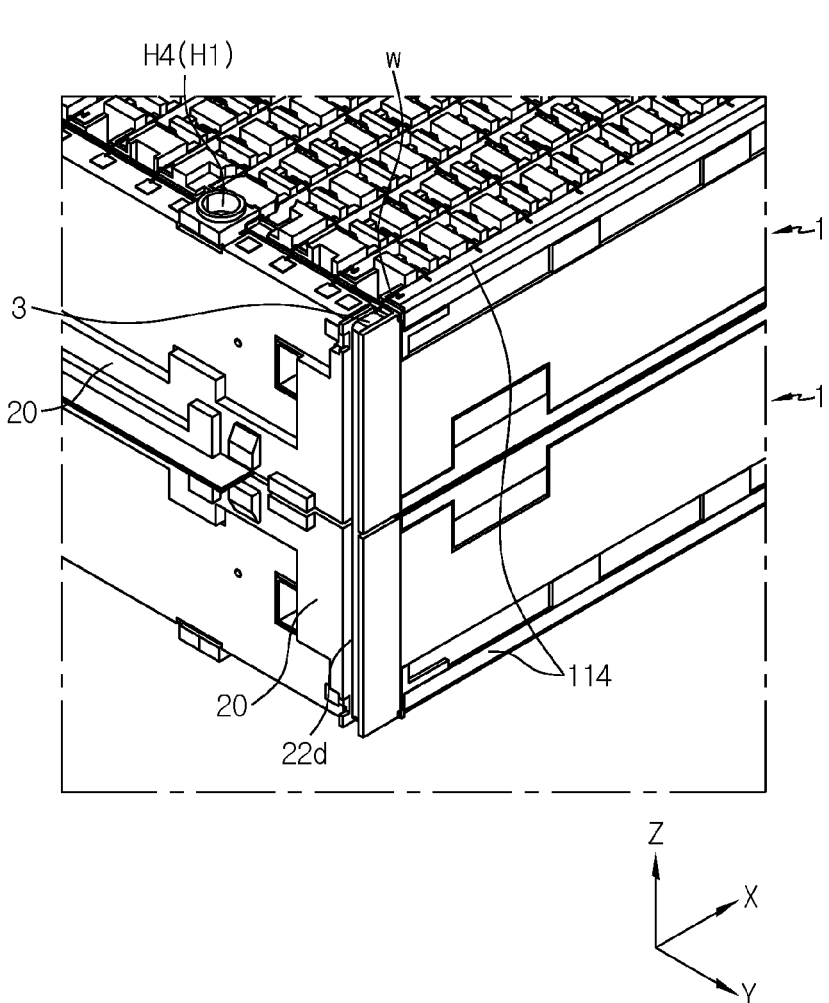
FIG. 15 is a diagram showing an electric connection between a pair of sub packs according to an embodiment of the present disclosure.
Figure 16:
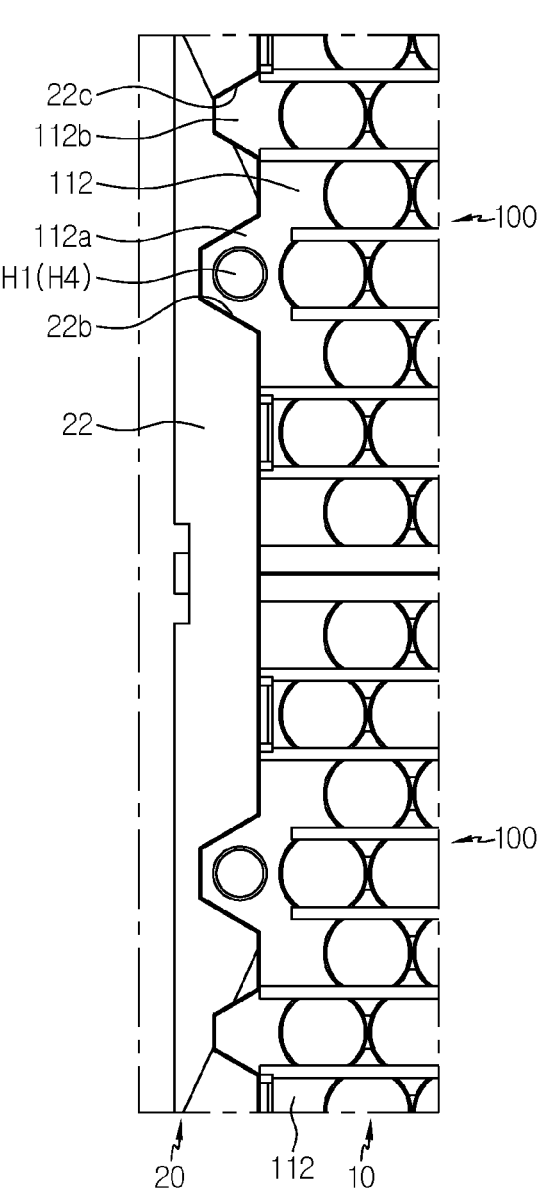
FIG. 16 is a diagram showing a coupling structure between the BMS assembly and the battery module assembly of the sub pack an embodiment of the present disclosure.

The bus bar placing portion 22*d* has a groove shape at one longitudinal side of the BMS frame 22. The bus bar placing portion 22*d* provides a space in which the pair of sub packs 1 coupled to each other in a mirror-symmetric form and the serial bus bar 3 for connecting the pair of sub packs 1 in series may be placed. As shown in FIG. 15, the pair of BMS assemblies 20 are coupled to each other in a mirror-symmetric form based on a central axis parallel to the width direction of the battery pack (a direction parallel to the Y-axis in FIG. 15). The bus bar placing portions 22*d* respectively provided to the pair of BMS assemblies 20 coupled to each other as above are connected to each other to provide a space in which the serial bus bar 3 may be placed.

As described above, the serial bus bar 3 placed on the bus bar placing portion 22*d* connects the parallel bus bars 114 respectively provided at the outermost parts of the pair of sub packs 1 to each other, and accordingly the pair of sub packs 1 are connected to each other in series. The serial bus bar 3 and the parallel bus bar 114 are electrically connected by wire bonding using a connecting wire W.

As described above, the battery pack according to an embodiment of the present disclosure not only has a structure in which the plurality of unit modules 110 may be simply fastened by bolting, but also has a structure in which the battery module assembly 10 formed by coupling the plurality of unit modules 110 and the BMS assembly 20 may also be easily fastened by bolting.

Figure 2:
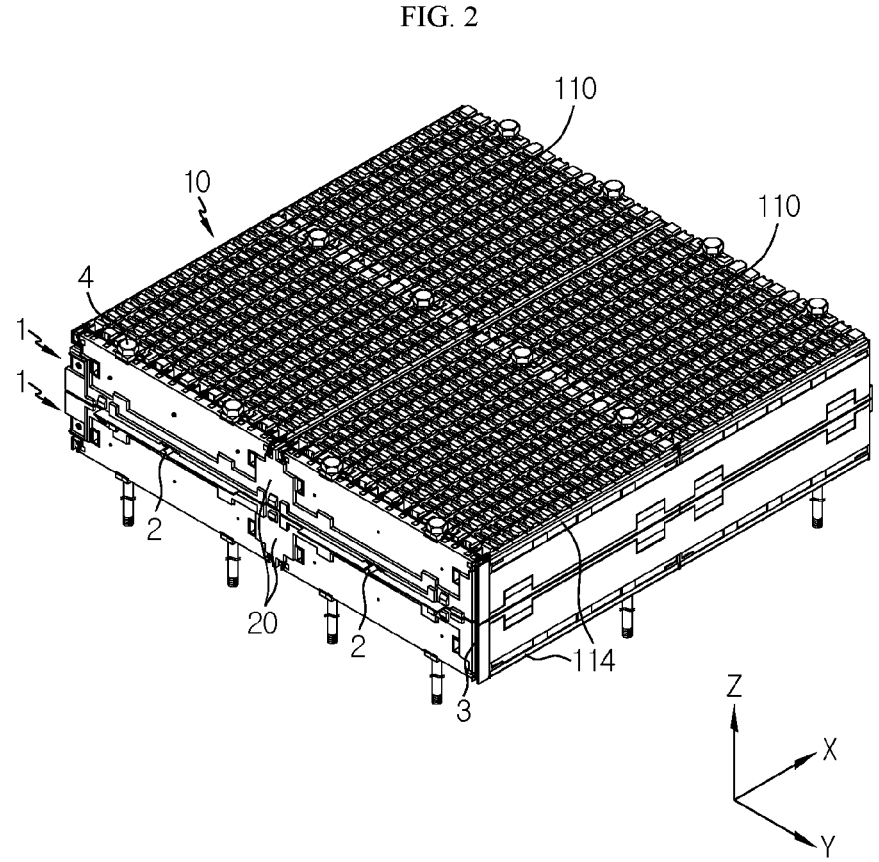
FIG. 2 is a partial perspective view showing a front surface of the battery pack depicted in FIG. 1.

That is, as shown in FIGS. 1 and 2, the battery pack according to an embodiment of the present disclosure has a structure in which the fastening bolts 4 are inserted into the bolting holes H1 to H4 in a state where the pair of sub packs 1 face each other in a mirror-symmetric form, so that the pair of sub packs 1 are fastened with each other. In addition, the battery pack according to an embodiment of the present disclosure has a structure in which the unit modules 110 of each sub pack 1 may be fastened and the battery module assembly 10 and the BMS assembly 20 may also be fastened simultaneously by fastening the pair of sub packs 1.

In addition, if the battery pack according to an embodiment of the present disclosure is used, by using the parallel bus bar 114 and the serial bus bar 3 and applying wire bonding to electrically connect components, the plurality of unit modules 110 may be simply connected in series and parallel in a mixed form, and accordingly it is very easy to expand the capacity and output voltage as needed.

Meanwhile, a vehicle according to an embodiment of the present disclosure includes the battery pack according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A sub pack, comprising:
a battery module assembly having a plurality of unit modules; and
a BMS assembly coupled to one longitudinal side of the battery module assembly,
wherein the battery module assembly includes:
a first sub module having a plurality of unit modules connected along a longitudinal direction of the first sub module; and
a second sub module having a plurality of unit modules and connected to the first sub module along a width direction of the plurality of unit modules,
wherein the BMS assembly includes:
a first BMS configured to control charging and discharging of the first sub module;
a second BMS configured to control charging and discharging of the second sub module; and
a BMS frame fastened to the longitudinal side of the battery module assembly and surrounding peripheries of the first BMS and the second BMS,
wherein each unit module includes:
a plurality of battery cells forming a plurality of cell groups;
a lower housing supporting the plurality of cells; and
at least one fixing protruding portion having a fixing protrusion at a first longitudinal side of the lower housing, and
wherein the BMS frame includes:
a plurality of second fixing accommodation portions provided at a location corresponding to the at least one fixing protruding portion and having a shape corresponding to the at least one fixing protruding portion.

2. The sub pack according to claim 1,
wherein each unit module further includes:
an upper housing coupled to an upper portion of the lower housing to provide an accommodation space for the plurality of battery cells; and
a plurality of parallel bus bars placed on an upper surface of the upper housing and arranged side by side and spaced apart from each other.

3. The sub pack according to claim 2,
wherein each cell group includes the plurality of battery cells disposed along a longitudinal direction the plurality of unit modules.

4. The sub pack according to claim 3,
wherein the battery cells included in a same cell group are connected in parallel through at least a respective one of the plurality of parallel bus bars.

5. The sub pack according to claim 4,
wherein the plurality of unit modules included in the first sub module are connected in parallel by an electric connection between a first group of parallel bus bars, among the plurality of parallel bus bars, located on a same first extension line as the plurality of unit modules included in the first sub module, and the plurality of unit modules included in the second sub module are connected in parallel by an electric connection between a second group parallel bus bars, among the plurality of parallel bus bars, located on a same second extension line as the plurality of unit modules included in the second sub module.

6. The sub pack according to claim 5, wherein the first sub module and the second sub module are connected to each other in series by an electric connection between parallel bus bars adjacent to each other.

7. The sub pack according to claim 6, wherein the parallel connection between the plurality of battery cells included in the same cell group, the parallel connection between the plurality of unit modules included in the same sub module and the serial connection between the plurality of sub modules adjacent to each other are made by wire bonding.

8. The sub pack according to claim 2, wherein the lower housing further includes:

at least one fastening protruding portion having a first bolting hole at the first longitudinal side of the lower housing;

a first fastening accommodation portion at a second longitudinal side of the lower housing and having a shape corresponding to the fastening protruding portion at a location corresponding to the fastening protruding portion; and a first fixing accommodation portion provided to the second longitudinal side of the lower housing and having a shape corresponding to the fixing protruding portion at a location corresponding to the fixing protruding portion.

9. The sub pack according to claim 8, wherein the upper housing includes:

a second bolting hole formed at a location corresponding to the first fastening accommodation portion; and a protrusion accommodating groove formed at a location corresponding to the first fixing accommodation portion and having a shape corresponding to the at least one fixing protrusion.

10. The sub pack according to claim 8, wherein the BMS frame further includes:

a plurality of front fastening portions provided at a location corresponding to the at least one fastening protruding portion and having a third bolting hole; and a plurality of second fastening accommodation portions provided at locations corresponding to the plurality of front fastening portions and the at least one fastening protruding portion.

11. The sub pack according to claim 2, wherein each of the first BMS and the second BMS includes a plurality of sensing terminals, the sensing terminals of the first BMS are electrically connected to a parallel bus bar of the first sub module, among the plurality of parallel bus bars, by wire bonding, and the sensing terminals of the second BMS are electrically connected to a parallel bus bar of the second sub module, among the plurality of parallel bus bars, by wire bonding.

12. A battery pack in which a pair of sub packs according to claim 1 are coupled to each other in a mirror-symmetric form based on a central axis parallel to a longitudinal direction of the sub pack.

13. The battery pack according to claim 12, further comprising:

a serial bus bar placed on the BMS frame to connect the pair of sub packs to each other in series.

14. A vehicle, comprising the battery pack according to claim 12.

15. The sub pack according to claim 1, wherein the BMS frame includes a bus bar placing portion at a longitudinal side of the BMS frame, and includes a groove extending along a height direction of the plurality of unit modules.

16. The sub pack according to claim 10, wherein each of the plurality of second fastening accommodation portions has a recess that accommodates a respective one of the plurality of front fastening portions.

17. The sub pack according to claim 16, wherein the third bolting hole communicates with the recess.

18. A sub pack, comprising:

a battery module assembly having a plurality of unit modules; and a BMS assembly coupled to one longitudinal side of the battery module assembly, wherein the battery module assembly includes:

a first sub module having a plurality of unit modules connected along a longitudinal direction of the first sub module; and a second sub module having a plurality of unit modules and connected to the first sub module along a width direction of the plurality of unit modules, wherein the BMS assembly includes:

a first BMS configured to control charging and discharging of the first sub module;

a second BMS configured to control charging and discharging of the second sub module; and a BMS frame fastened to the longitudinal side of the battery module assembly and surrounding peripheries of the first BMS and the second BMS, wherein each unit module includes:

a plurality of battery cells forming a plurality of cell groups;

a lower housing supporting the plurality of battery cells;

an upper housing coupled to an upper portion of the lower housing to provide an accommodation space for the plurality of battery cells; and a plurality of parallel bus bars placed on an upper surface of the upper housing and arranged side by side and spaced apart from each other, and wherein the lower housing includes:

at least one fastening protruding portion having a first bolting hole at a first longitudinal side of the lower housing;

at least one fixing protruding portion having a fixing protrusion at the first longitudinal side of the lower housing;

a first fastening accommodation portion at a second longitudinal side of the lower housing and having a shape corresponding to the fastening protruding portion at a location corresponding to the fastening protruding portion; and a first fixing accommodation portion provided to the second longitudinal side of the lower housing and having a shape corresponding to the fixing protruding portion at a location corresponding to the fixing protruding portion.

19. The sub pack according to claim 18, wherein the upper housing includes:

a second bolting hole formed at a location corresponding to the first fastening accommodation portion; and a protrusion accommodating groove formed at a location corresponding to the first fixing accommodation portion and having a shape corresponding to the at least one fixing protrusion.

20. The sub pack according to claim 18,
wherein the BMS frame includes:

a plurality of front fastening portions provided at a location corresponding to the at least one fastening protruding portion and having a third bolting hole;

a plurality of second fastening accommodation portions provided at locations corresponding to the plurality of front fastening portions and the at least one fastening protruding portion; and a plurality of second fixing accommodation portions provided at a location corresponding to the at least one fixing protruding portion and having a shape corresponding to the at least one fixing protruding portion.

\* \* \* \* \*